(12) United States Patent
Van Horssen

(10) Patent No.: US 6,210,307 B1
(45) Date of Patent: Apr. 3, 2001

(54) APPARATUS FOR AUTOMATIC MACHINING

(76) Inventor: Charles A. Van Horssen, 21622 N. 14th Ave., Phoenix, AZ (US) 85027

( * ) Notice: Subject to any disclaimer, the term of this patent is extended or adjusted under 35 U.S.C. 154(b) by 0 days.

(21) Appl. No.: 09/200,899

(22) Filed: Nov. 27, 1998

(51) Int. Cl.[7] .......................... B23Q 3/157; B23Q 17/22; B23C 9/00
(52) U.S. Cl. ................. 483/1; 29/707; 29/712; 409/131; 409/218; 483/14
(58) Field of Search .................. 483/1, 14, 15, 483/12, 2, 19, 31; 29/33 R, 701, 705, 707, 711, 712; 414/729; 409/174, 218, 195, 188, 131

(56) References Cited

U.S. PATENT DOCUMENTS

| | | | | |
|---|---|---|---|---|
| 4,404,727 | * | 9/1983 | Zankl | 483/14 |
| 4,571,814 | * | 2/1986 | Palfrey et al. | 483/14 |
| 4,608,747 | * | 9/1986 | Link et al. | 483/14 |
| 4,809,425 | * | 3/1989 | Monforte | 483/14 X |
| 4,951,376 | * | 8/1990 | Grund | 483/14 |

* cited by examiner

Primary Examiner—William Briggs
(74) Attorney, Agent, or Firm—Tod R. Nissle, P.C.

(57) ABSTRACT

A vertical machining center is retrofitted to permit the automatic machining of a plurality of like unfixtured parts loaded into the vertical machining center on a tray.

6 Claims, 2 Drawing Sheets

APPARATUS FOR AUTOMATIC MACHINING

This invention relates to equipment for cutting and shaping parts.

More particularly, the invention relates to apparatus for automatically machining a plurality of unfixtured small parts each sized to fit within a cube about six inches square.

In another aspect, the invention relates to machining apparatus including a computer program which, when selected part parameters are input into the computer program, automatically makes a tray for holding a plurality of the parts.

In a further aspect, the invention relates to a method for retrofitting a conventional manned vertical machining center (VMC) to produce an unmanned machining center (UMC) which can eliminate operator errors while sequentially automatically machining a plurality of small parts.

A vertical machining center is a piece of machining equipment which maintains a drill or other tool in a vertical orientation while the tool is moved up and down or laterally. The tool is utilized to cut material from a work piece.

While vertical machining centers have existed for many years, one particular drawback of conventional vertical machining centers appears to be their inability to automatically machine small unfixtured parts each sized to fit in cube having six inch long edges.

Accordingly, it would be highly desirable to provide an improved vertical machining center adapted to automatically machine small work pieces.

Therefore, it is a principal object of the invention to provide an improved vertical machining center.

Another object of the invention is to provide a method for adapting a conventional vertical machining center to machine automatically small parts or work pieces.

Figure 1:
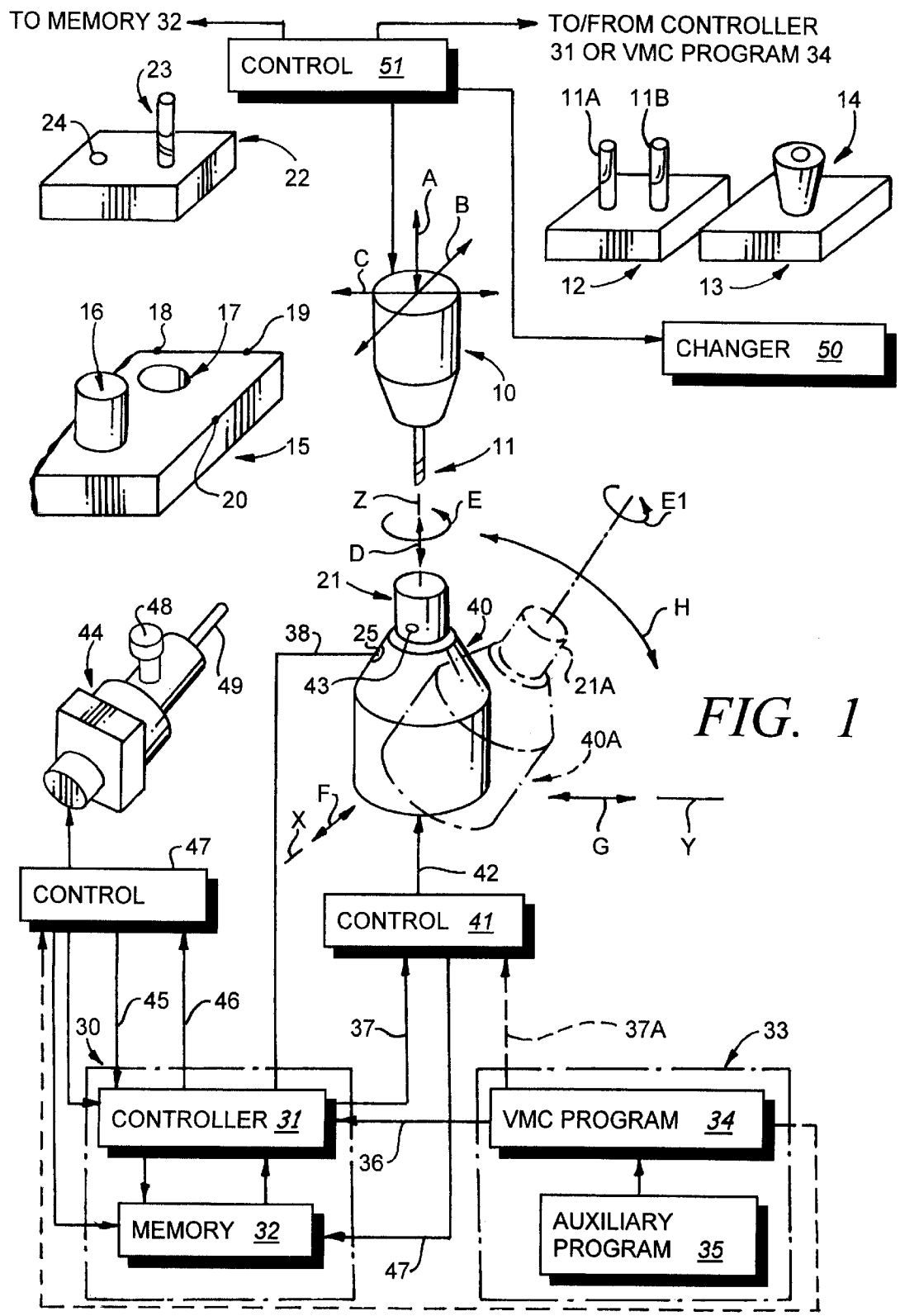
Figure 2:
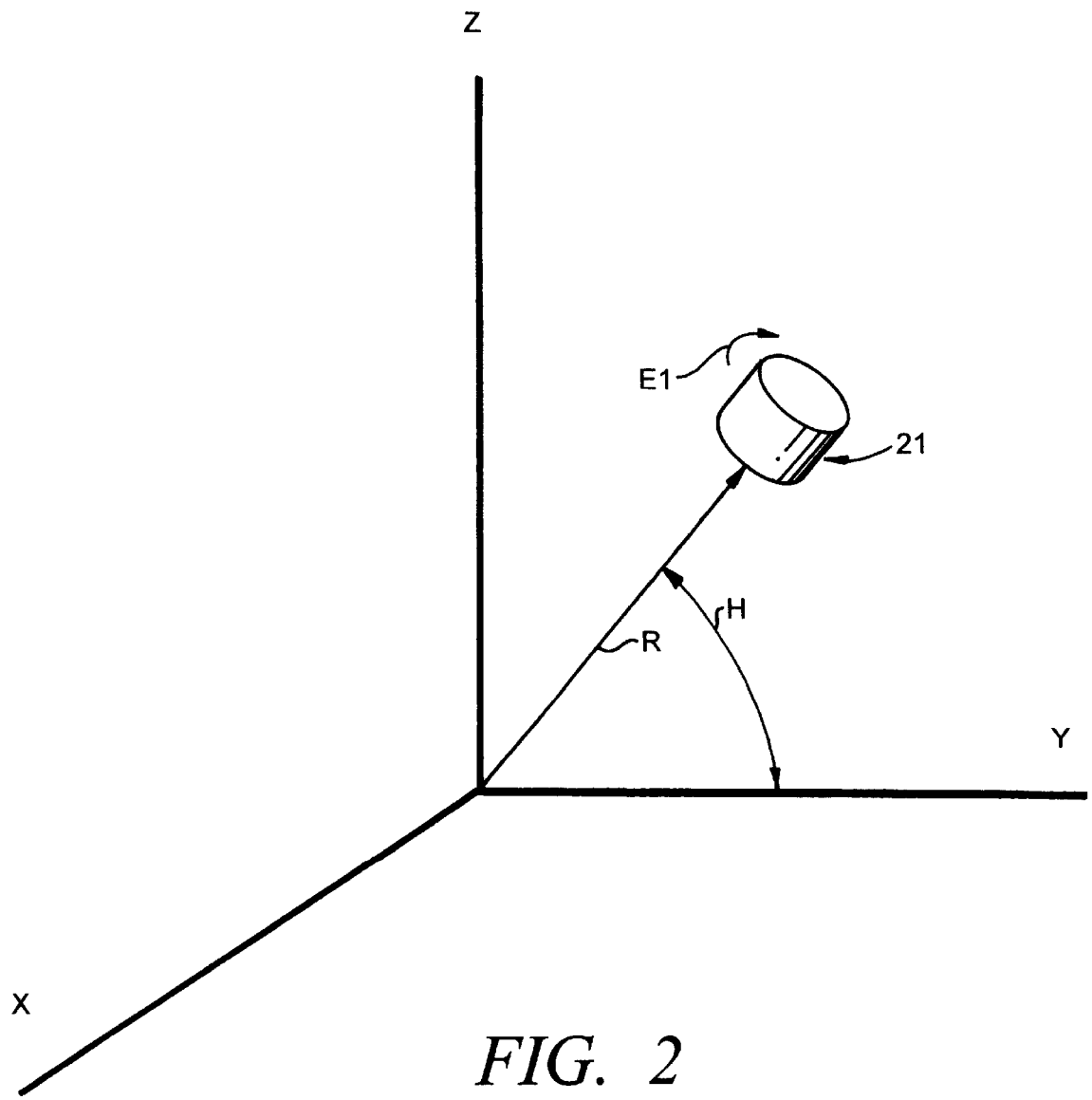

These and other further and more specific objects and advantages of the invention will be apparent to those skilled in the art from the following detailed description thereof, take in conjunction with the drawings, in which:

FIG. 1 is a diagram illustrating a vertical machining center constructed in accordance with the invention; and, FIG. 2 is a axial diagram illustrating the five axes along or around which a work piece or spindle is positioned.

Briefly, in accordance with my invention, I provide an improved vertical machining center. The vertical machining center includes holding apparatus for holding a work piece; a spindle for holding tools; a system for moving at least one of the pair comprising the spindle and the holding means along at least one vertical axis, for moving at least one of the pair comprising the spindle and the holding apparatus in a lateral plane normal to the vertical axis, and for rotating the holding apparatus about at least two axes; apparatus for loading tools into and unloading tools from the spindle; a tray for holding a plurality of work pieces of identical shape and dimension; a parts mover adapted to be loaded in the spindle and to pick up a work piece from said tray and deposit the work piece in the holding apparatus; and, apparatus for loading the parts mover in and unloading the parts mover from the spindle.

In another embodiment of the invention, I provide an improved method for retrofitting a conventional vertical machining center to automatically machine small parts. The vertical machining center includes a spindle; holding apparatus for holding a workpiece; apparatus for moving at least one of the spindle and the holding means along at least one vertical axis, and moving at least one of the spindle and the holding means in a lateral plane normal to the vertical axis, at least one tool for mounting in the spindle; mounting apparatus for mounting the tool in the spindle; and, a computer program for, after the tool is loaded in the spindle, controlling the movement of the spindle to cut material from a workpiece. The improved method includes the step of installing on the vertical machining center a rotation apparatus for rotating the holding apparatus about at least two axes; a tray for holding a plurality of work pieces of identical shape and dimension; a parts mover adapted to be mounted on the spindle by the mounting apparatus to pick up a work piece from the tray and deposit the work piece in the holding apparatus. The improved method also includes the step of installing an auxiliary computer program to control automatically the operation of said holding means, loading means, and parts mover to move parts from the tray to the holding means and remove material from the parts in the holding apparatus.

In a further embodiment of the invention, I provide an improved vertical machining center including holding apparatus for holding a work piece; a spindle; apparatus for moving at least one of the pair comprising the spindle and the holding apparatus along at least one vertical axis, for moving at least one of the pair comprising the spindle and the holding apparatus in a lateral plane normal to the vertical axis, and for rotating the holding apparatus about at least two axes; at least one tool; a first probe for contacting a work piece mounted in the holding apparatus; a tray for holding a plurality of work pieces of identical shape and dimension; a parts mover adapted to be loaded in the spindle and to pick up a work piece from the tray and deposit the work piece in the holding means; apparatus for loading and unloading the tool, the first probe, and the parts mover into and from the spindle; and, a second probe for determining the position of at least one of the tool, the first probe, and the parts mover in the spindle when the tool, the first probe, or the parts mover is mounted in the spindle.

Turning now to the drawings, which depict the presently preferred embodiments of the invention for purposes of illustrating the invention and not by way of limitation of the scope of the invention and in which like reference characters refers to corresponding elements throughout the several views, FIG. 1 illustrates a vertical machining center constructed in accordance with the invention and including a spindle 10, a control 51 (including a motor for opening and closing spindle 10 and for moving spindle 10 in the directions indicated by arrows A, B, and C), a collet 40 (or vise or other holding apparatus), and a control 41. If desired, spindle 10 need only be movable along a vertical axis in the directions indicated by arrows A. The restricted movement of the spindle along a vertical axis during machining of a work piece mounted in collet 40 is, in fact, utilized in the presently preferred embodiment of the invention.

Collet 40 ordinarily is mounted on a X-Y table or other positioning means which can be moved in a lateral plane. The X and Y axes depicted in FIG. 1 lie in this lateral, or horizontally oriented plane. Control 41 or control 51 includes a motor(s) for opening and closing collet 40, for moving the table (and collet 40) in the directions indicated by arrows F (along axis X) and arrows G (along axis Y), and for moving the spindle 10 vertically in the directions indicated by arrows A. Auxiliary positioning apparatus (not shown) is mounted on the X-Y table with collet 40. This auxiliary positioning apparatus is used to (1) pivot collet 40 in the direction of arrows H (FIG. 1) about the X axis or an axis parallel to the X axis, and (2) turn collet 40 in the direction of arrow E about an axis passing through the center of workpiece 21. Control 41 also includes a motor(s) for operating the auxiliary positioning apparatus to move collet 40 in the directions indicated by arrows H (tilting collet in the Y-Z plane), and in the directions indicated by arrows E1 and E (rotating collet 40 about the longitudinal axis or centerline (for example, the Z axis in FIG. 1) extending through collet 40.

If desired, spindle 10 can be adjustable in the directions indicated by arrows A, B, and C, while collet 40 can be adjustable only in the directions indicated by arrows H and E.

The vertical machining center also includes a changer 50 which functions to insert probes 11A and 11B, parts mover 14, and tools 11 and 23 in spindle 10. Control 51 includes a motor for moving and operating changer 50. Changer 50 typically comprises a robotics assembly specially adapted to load and unload tools and other articles from spindle 10.

When not mounted in spindle 10, tools 11 and 23 are stored in openings 24 in a tray 22, are hung from and stored on a chain, a carousel or are otherwise stored in the vertical machining center for ready access by changer 50. Similarly, when not mounted in spindle 10, probes 11A and 11B and work piece mover 14 are stored in a tray 12, 13, respectively, or are otherwise stored in the vertical machining center.

Work pieces 16 and 21 are stored in openings 17 in a tray 15. Tray 15 including a first edge perpendicular to a second edge. Points 18 and 19 lie on the first edge. Point 20 lies on the second edge.

A so-called stationary probe 44 provides an X-Y-Z reference point and is mounted in the vertical machining center and includes probe surfaces 48 and 49. The base of probe 44 is fixed to and moves simultaneously with the X-Y table on which collet 40 is mounted such that the orientation of the base of probe 44 with respect to the table is constant. The probe 44, the table, the collet 40 mounted on the table, and the auxiliary positioning apparatus (for moving the collet 40 in the directions indicated by arrows H and E) mounted on the table collectively all move simultaneously in directions along or parallel to the X and Y axes which are illustrated in FIG. 2.

Personal computer 30 includes a controller 31 and memory 32. Controller 31 includes a microprocessor and other components commonly found on a personal computer. Also computer 30 can be integrated with the computer in the vertical machining center, computer 30 is presently physically separated from but connected to the other computer 33 in the vertical machining center. The vertical machining center computer includes a vertical machining center program (VMC Program) 34 ordinarily found in conventional machining centers. The vertical machining center computer 33 also includes an auxiliary program 35.

FIG. 2 illustrates the movement and positioning of a work piece 21 in the Y-Z plane when collet 40 is displacing by the auxiliary positioning apparatus mounted on the X-Y table. The bottom (or other reference point) of work piece 21 is located a distance indicated by arrow R from the intersection of the X, Y and Z axes, which axes are illustrated in FIGS. 1 and 2. Collet 40 can be tilted by the auxiliary positioning apparatus to position work pieces 21 at a desired angle H with respect to axis Y. Collet 40 can be rotated by the auxiliary positioning apparatus to rotate work piece 21 in the direction indicated by arrow E1. When work piece 21 rotates in the direction indicated by arrow E1, it rotates around an axis coincident with arrow R in FIG. 2. Collet 40 can be continuously rotated by the auxiliary positioning apparatus to rotate work piece 21 in the direction of arrow E1 at a selected speed, or can be incrementally rotated by the auxiliary positioning apparatus to rotate work piece 21 from a first position to a second position and to then stop the rotation of work piece 21.

Distance R (FIG. 2) is measured by the individual operating the machine of the invention. The individual then inserts distance R into VMC 34. Distance R is a parameter. The VMC 34 and Auxiliary Program 35 therefore know distance R and angle U. Auxiliary Program 35 can utilize distance R and the sine or cosine of angle U to determine the spatial location of work piece 21 and of each point on work piece 21.

As will be further described and illustrated below, some of the functions performed by the vertical machining center of FIG. 1 include movement of parts or work pieces between a tray 15 and collet 40; the machining of work pieces while the work pieces are mounted in collet 40; the adjustment of the position of the collet 40 (utilizing he X-Y table and the auxiliary positioning apparatus) utilizing the R and sine and cosine values of angle U; the use of probes 11A and 11B in spindle 10 to check the dimensions of a machined part; making decisions on when to change tools (i.e., if tool is broken), to change parts (i.e., when machining is completed or part is out of tolerance), to change probes (i.e., when a probe is broken), or to change the part mover (i.e., when the part move is broken or when a work piece or part is successfully mounted in collet 40 or tray 15 by the part mover 14; keeping a record of the number of parts machined, of the number of parts out of tolerance, of the number of broken tools, etc.; and, automatically sending a message to an operator on his telephone pager when a problem occurs during the automatic operation of the vertical machining center of the invention.

The auxiliary program 35 includes parameters for controlling the movement of a workpiece, the movement and use of a probe to sense tool positions and to sense the dimensions of a workpiece, and the movement of a tool. For example, the auxiliary program can include parameters defining how, after a tool is mounted in spindle 10, spindle 10 is laterally moved in directions parallel to axis Y to a position over the upper circular surface of sensor 48 and is then moved vertically downwardly until the distal tip of the tool (for example, a drill bit) touches the upper circular surface of sensor 48. When the distal tip of the tool touches the upper circular surface of sensor 48, program 35 knows the position of spindle 10 and therefore knows the distance of the tip of the tool from spindle 10 and can determine if the tool is properly seated in spindle 10. Any desired method can be utilized to determine to position of spindle 10. For example, the number of turns of a motor which moves spindle 10 vertically downwardly toward sensor 48 can be counted. While the parameters for testing a tool in the foregoing manner remain unchanged in program 35, the desired distance of the tip of the tool from spindle 10 is determined by vertically downwardly displacing spindle 11 until the tip of tool 11 touches the surface of sensor 48.

Similarly, program 35 can include parameters defining how a parts mover 14 is loaded by changer 50 in spindle 10, how parts mover 14 is used to move a work piece 21 from a tray 15 to collet 40, how collet 40 is closed to secure the work piece 21 in the collet, how probe 11A or 11B is used to contact a point on the bottom (or other area) of work piece 21 to determine if work piece 21 is properly seated in collet 40, how the position of collet 40 is detected, how the changer 50 removes the parts mover 14 from the spindle and inserts a tool 11, how the spindle 10 is moved laterally and then downwardly toward work piece 21, how spindle 10 is moved away from work piece 21 after tool 11 cuts the work piece, how changer 50 removes tool 11 from spindle 10 and inserts a sensor probe 11A, how the spindle is laterally and vertically moved to contact the tip of the probe to the circular surface of sensor 48 to insure probe 11A is properly seated in spindle 10, how spindle 10 (and probe 11A) are laterally and vertically moved to permit probe 11A to check the dimensions of work piece 21. The foregoing parameter set can remain constant for each group of like work pieces which each undergo the same machining sequence. For each new group of like work pieces (having an identical shape and dimension different from the shape and dimension of each of the work pieces in the prior group of work pieces) and/or each new set of machining instructions, the operator inputs information on the type of tool(s) desired, the position (s) of the collet (i.e., the required movement of collet 40 to properly position the work piece 21 to be cut by tool 11), the depth (to within a desired tolerance range) of a hole cut in work piece 21 by tool 11, etc.

The changer 50 presently functions to take a tool 11 or 23, probe 11A or 11B, or parts mover 14 off a chain or tray or carousel and to load the same into the spindle 10. Typically operator inputs data into auxiliary program 35 which defines the tool, probe, or part mover to be loaded in spindle 10.

As indicated in FIG. 2, during operation of the vertical machining center of the invention the dimension indicated by arrow R remains in the Y-Z plane. During the machining of work piece 21, the position of the X-Y-Z axes with respect to one another remains fixed, i.e., each axis is normal to the other two. When the X-Y table moves, the X-Y-Z axes move with the table. For example, if the X-Y table (and collet 40) is moved from the position shown in FIG. 1 in the direction of arrows F to a new position, the X-Y-Z coordinate system "moves" with collet 40 such that the Y-Z plane at the new position of collet 40 is parallel to the Y-Z plane illustrated in FIG. 1.

In the vertical machining center of the invention, certain equipment and processes are believed critical. The spindle 10 is utilized both to move a work piece 21 to collet 40 and to machine the work piece 21 in the collet. After a tool 11, probe 11A, or parts mover 14 is inserted in spindle 10, the table probe 44 is used to check the location (i.e., the seating) of the tool, probe, parts mover 14 or work piece 21 (held in parts mover 14) in the spindle 10. The table probe 44 is therefore an important feature of the invention, as are the parts or work piece tray 15 and the part or work piece mover 14. The tools 11, 23 utilized are standard tools or are tools having a shape, size, and/dimension predefined in the auxiliary program so that an operator can, by inputting appropriate data into program 35, readily select the tools he wishes to utilize. The position of collet 40 must be adjustable (preferably along the X-Y axes, although the position of collet 40 can conceivably be altered along the X-Y and/or Z axes), must be rotatable to vary angle U, and must be rotatable in at least one of the directions indicated by arrows E. The auxiliary program is, as earlier described, provided with parameters which—with the inputting of appropriate data and instructions concerning the positioning of the raw work piece in the spindle and collet, concerning dimensions and tolerances of the work piece 21 after it is machined, and concerning the tools to be utilized and cutting instructions to be followed during the machining of a work piece 21—enable the vertical machining center to automatically continuously machine a plurality of like sized small parts.

Examples of drilling instructions which can be input into the auxiliary program for a work piece 21 are to mill hex, to turn a work piece 21 down, or to drill hole in a work piece 21.

The inclusion in auxiliary program 35 of parameters for the raw unmachined part and for the part after it is machine facilitates the automatic machining of each of a plurality of like parts or work pieces 21.

The auxiliary program 35 includes a machining program unique to each workpiece and includes an auxiliary operating program. The auxiliary operating program is presently comprised of macros. The machining program utilizes a first set of parameters. This first set of parameters is, in short form, styled "PSI". The auxiliary operating program utilizes a second set of parameters. This second set of parameters is, in short form, styled "PSII".

Example of PSI parameters which can be input into the machining program component of auxiliary program 35 for a particular work piece include:

1. How far apart the work pieces 16, 21 are in the parts tray 15.
2. The number of columns and rows in the parts tray 15.
3. How deep the part-receiving indents are in the tray 15.
4. Tell parts mover 14 to stop about ¾' (or any other desired set distance) above tray 15 after a rapid decent, followed by a slow feed toward the part or work piece 21.
5. Tell parts mover 14 to dwell above tray 15 for ¼ second (or any other desired set time) while the parts mover grabs the part 21.
6. Tell parts mover 14 to dwell a certain distance above collet for ¼ second while the collet 40 tightens onto the part
7. Define positioning of collet 40 during part loading or machining by defining angle H.
8. Define rotation of collet 40 and piece 21 by the auxiliary positioning apparatus during the machining of piece 21

The PSII parameters concern things that do not change from one type of part to the next. Examples of PSII parameters are parameters for the calibration of a table probe 44 or spindle probe 11A, for movement of the X-Y table, for movement of the auxiliary positioning apparatus, for calibration of the position of the parts tray 15 if the position of tray 15 in the VMC is skewed.

Interfacing a personal computer with a vertical machine center requires the utilization of an M-code, of a R232 I/O (DPRNT), of a skip signal input, and of connection to air and coolant control system(s).

In a conventional vertical machine center, the tools are always vertically oriented when they are used to cut a work piece. Such vertical machining centers each either have a table which moves in the X-Y plane or enable the vertically oriented tool to move in the X-Y plane. Conventional vertical machining centers do not permit rotation of a part or work piece 21. The work piece 21 must be taken out of the chuck and repositioned.

Parts mover 14 is presently preferably pneumatically operated.

The PC controller 31 can be accessed by placing a telephone call from a location remote from the vertical machining center of the invention.

The auxiliary program 35 resides in the original vertical machining center computer along with the original vertical machining center (VMC) program 34. The auxiliary program is loaded into the original vertical machining center computer in a manner similar to that for loading a program in a conventional PC or other computer. The auxiliary program 35 includes subsidiary programs which interface with VMC program 34. The auxiliary program 35 (VHAP)

enables production data to be sent from the VMC program 34 to controller 31.

The conventional VMC program can not carry out the automated processes ofthe vertical machining center of the invention. The auxiliary program interfaces with the VMC program and also drives probes 11A, 11B, and 44, controls the tools, controls the cutting and positioning of tray 15, controls the positioning or operation of collet 40 on the X-Y-Z axes and in the directions indicated by arrows H and E, and retains process data like, for example, error data and data indicated how many parts have been machined. Error data can, for example, be generated to indicate that a tool is broken, that a machined part is out-of-tolerance.

RS232I/O is an industry standard (EIA) communications interface. Modems often have this interface. An RS232I/O incorporates defined connector like, for example, Cannon DB25, incorporates defined pin numbers and electrical signals, incorporates defined voltage levels, incorporates defined timing of 1 and 0 bits and how such bits cross the interface. The RS232I/O defines how to transmit computer data from one thing to another, such as one computer to another computer. The invention utilizes an RS232I/O 36 to permit the PC 30 to communicate with the computer 33 in the vertical machining center.

A skip input is a specialized input that a machine uses to indicate tool dimensions (when for example the tip of the tool touches the table probe) or parts dimensions (using the spindle probe). When the machine computer 33 issues a command to its machine tool side (e.g., "Move this axis 20 inches to the right"), it can do it in one of several ways. Computer 33 can issue a command that says "Move spindle 10 rapidly twenty inches to the right", or, computer 33 can say "Move spindle 10 slowly at one-half inch a second twenty inches to the right". computer 33 can issue either of these commands in conjunction with a skip input command: "Move twenty inches to the right but stop when you get a signal from the outside world (i.e., from a probe)." If a tool mounted in the spindle 10 touches a probe before the spindle has moved twenty inches the tool will stop and the machine can make a measurement. Consequently, the skip input command causes spindle 10 to stop before it travels the full twenty inches. When the tool hits the probe, the probe sends a skip input signal to computer 33 through controller 30 that causes computer 33 to issue a command stopping the movement of spindle 10 and of the probe or tool in the spindle 10. The skip input is an interface between the probes 44, 11A, 11B and the computer 33 controlling operation of the tools 11 and 23, changer 50, spindle 10, probes 11A and 11B and 44, collet 40 and parts mover 14.

An M-code output is a normal machine tool command for activating external devices. When spindle 10 is activated and operated, computer 33 controls the movement of spindle 10 along the X-Y-Z axes and turns on the spindle 10 (causes it to rotate or with its chuck to grasp or releases a tool or other object) and the flow of coolant to the spindle 10. Consequently, for example, the M-code "M3" can be utilized by computer 33 to turn on the spindle. When turned on, the spindle typically rotates at a selected RPM, for example at 2000 RPM. The M-code "M5" can be used to turn spindle 10 off so it will not rotate. Many conventional vertical machining center computers 33 include additional M-codes which can be programmed to carry out desired commands. For example, if additional M-codes "M70 to M90" are included in a machine, the M-code "M70" can be utilize to open collet 40. Collet is presently pneumatically controlled and operated.

A conventional VMC computer 33 includes an operating system but does not include application programs. The auxiliary program 35 utilizes macros which function in a manner similar to the macros in WORD PERFECT word processing software. These macros in essence become a new operating system, even though architectually they are not. The auxiliary program 35 presently preferably has 70 macroprograms that intercommunicate. Auxiliary program 35 is loaded on top of the existing operating system consisting of the VMC program 34. Auxiliary program 35 functions as a virtual operating system layer that is placed on top of the VMC program and is implemented using the macroprograms. The VMC program is similar to DOS, but has a much lower level capability. Movement of spindle 10, collet 40, etc. are controlled by auxiliary program 35 via the VMC program.

A standard VMC includes tools that are mounted in spindle 10 and include an automated system for selecting a tool and loading it in the spindle.

Communication with the VMC program 34 can be accomplished with a keyboard, via the auxiliary program 35, or in any other desired manner.

Getting information into and out of vertical machine center computers 33 is difficult because they are not designed with open architecture. Such computers are self-contained units, like small desk top calculators, that can add, substract, etc. If an individual wanted to connect a small desk top calculater so the letter struck on the typewriter would appear on the screen of the calculator, such a connection would be difficult to achieve because there is not an interface plug between the calculator and typewriter. A vertical machine center computer is a stand alone computer with typically one IO port, which makes it difficult to get information in and out of the computer 33. The IO port is used to load and unload stand alone programs. We are using this IO port as an interface to send data from computer 33 to PC 30. The auxiliary program 35 is loaded through the IO port into computer 33. Program 35 is a shell program that receive various instructions for operating tools, parts mover, etc. for a particular work piece 21 and that is then loaded via the IO port into computer 33.

An M-code is an instruction—like skip signal in reverse—a signal out that tells something in the outside world to do something. It is a command. After the action commanded by an M-code is completed, the PC 30 generates a signal back to computer 33 indicating that the action has been completed. For example, the auxiliary program 35 and VMC program 34 can generate an M-code signal to the the PC 30 which commands that collet 40 be opened. PC 30 opens the collet 40 and then sends back an Mfin signal to the VMC program 34 that the collet 40 has been opened. The M-code signal is initiated by the auxiliary program 35. The program 35 generates RS232 data that is sent via the VMC program 34 through the RS232 line to PC. The PC 30 determines when collet 40 is opened by monitoring a switch connected to the PC.

The following example is presented not by way of limitation but to demonstrate how the invention can be utilized to retrofit a vertical machining center to automatically process small parts or work pieces in accordance with the invention.

EXAMPLE

A conventional vertical machining center is provided and is retrofit and utilized as follows.

Step 1: Modify Conventional VMC (Vertical Machining Center)

A. Remove collet that moves in X-Y plane (spindle on conventional VMC can also move in X-Y plane), and install five axis collet. Five axis collet moves in X-Y plane in directions parallel to X and Y axes, moves toward and away from intersection of X-Y-Z axes, pivots about X axis in Y-Z plane, and rotates the part about a centerline or n axis extending through the intersection of the X-Y-Z axes.

B. Install (if not already on the VMC) a spindle which moves up and down and in directions parallel to the X and Y axes.

C. Install station for parts tray.

D. Install stationary table probe. Table probe moves simultaneously with the five axis collet so that position of the stationary probe with respect to the center of the rotational axis of the collet and the part in the collet remains fixed. The stationary table probe is used to determine the distance a tool extends from the spindle and to determine if a part is seated the proper distance into the part mover 14.

E. Install "spindle" probe that can be loaded into spindle and used to measure the amount of material which has been removed from a part. The spindle probe can, for example, determine the depth of a hole drilled in a part. The spindle probe also used to determine the location of the parts tray.

F. Install parts mover that can be loaded into spindle and used to transfer parts between the parts tray and the five axis collet.

G. Install external PC for (1) loading auxiliary program into VMC, (2) communicating with the VMC software (VMCS) originally existant in the VMC computer, (3) receiving sensor signals from the collet to determine when collet is opened or closed and to generate and send Mfin signals back to the VMCS, (4) controlling collet cleaning, (5) interfacing with five axis collet, (6) interfacing with personnel from off site to inform them of the status of the machine.

H. Install auxiliary program 35 (see attached drawing). In the well known word processing program WORDPERFECT, a "macro" is a file that is created to represent a series of keystrokes. After a macro is creating, typing the name of the macro is comparable to typing all the keystrokes (and commands) in the macro. Macros are like tiny programs withing the larger WORDPERFECT program. The program 35 includes a plurality of similar macro programs that communicate with each other. These macros in program 35 in essence become a new operating system even though architecturally they are not. The macros in program 35 create a virtual operating system layer that is placed on top of the existing operation system program 34 in the VMC computers. The program 35:

1. Controls the spindle probe and table probe. Provides the instructions (parameters) defining and controlling the movement and position of the spindle probe and table probe.

2. Controls the tools. Provides the instructions (parameters) for the tool movement necessary to create the desired finished part. For example, one parameter can instruct a drill to drill into a part to a depth of ⅛ of an inch after the spindle 10 moves the distal end of the drill into contact with the part. Another parameter can instruct the collet 40 to tilt through an angle H from axis Z of forty degrees and/or to rotate in the direction E through an arc of 20 degrees prior to drill 11 drilling a hole in part 21. Another parameter can instruct spindle 10 to move downwardly a selected vertical distance to insure that a part held in a parts mover 14 in spindle 10 is seated a selected distance into collet 40. Another parameter can instruct spindle 10 to dwell a selected amount of time in a position over collet 40 while collet 40 closes to grasped a part loaded into collet 40 by a parts mover held in spindle 10.

3. Controls the parts mover. Provides the instructions (parameters) for the movement of spindle 10 with the parts mover, and for the operation of the parts mover while in the spindle 10. For example, one parameter can instruct the spindle 10 to stop when the parts mover is about ¾ of an inch above the parts tray after a rapid descent, followed by a slow feed toward a part setting in the part tray. Another parameter can instruct the spindle 10 to dwell for ¼ of a second while the parts mover contacts and secures the part.

4. Controls cutting and positioning the parts tray. Provides parameters like the spacing between indents cut in the parts tray, the number of columns and rows in the parts tray, and the diameter and depth of the indents cut in the parts tray.

5. Interfaces between the five axis collet and the external PC.

6. Retains process data like error data.

7. Utilizes skip inputs. A skip input is a command triggered by input from a probe. If, for example, the table probe is touched by the end of a tool mounted in a moving spindle, then contacts on the probe are closed and a signal is sent over the probe wires to the VMC operating program 34 and to the VHAP (auxiliary program) 35. When the signal is received by the VHAP, the VHAP generates a command which tells the spindle to stop moving.

8. Utilizes interfaces. An interface is the junction of two devices that communicate with each other in some way. With the table probe and the VMC computer, the interface comprises the probe wires which interconnect the VMC computer and the table prove. With a keyboard and a computer, the interface is a multiple pin plug—socket which includes the plug on the end of the keyboard wire and the plug connected to the computer.

9. Produces M-codes. An M-code is a simple instruction or command action signal. An M-code is the only output with a feedback signal (M-fin) available in a conventional VMC. An M-code signal is transmitted via the VMC operating program 34 to the PC. For example, one M-code signal says open the parts collet. The PC opens the collet and sends back confirmation to the VHAP 35 that the collet 40 has been opened in the form of an M-fin signal.

10. Determines that when a part is loaded in the collet 40:
    a. The bottom of the part (or some other reference point on the part) is the desired distance R from the intersection of the X,Y, Z axes. The spindle probe 11A, 11B is used to make this determination.
    b. The centerline or other axis D about which the part rotates lies in the Y-Z plane at a selected angle U from the Y axis. This is accomplished by having the VHAP command the collet 40 be positioned by being pivoted about the X axis to move to the selected angle U with respect to the Y axis.

11. Determines if a tool 11 has cut a part mounted in collet 40 to the appropriate depth. VHAP 35 directs the spindle probe to measure the depth of the cut.

Step 2: Program appropriate parameters into VHAP 35 to, by way of example and not limitation, define cutting of parts tray, to define location of parts tray, to define movement of parts mover to retrieve a part from the parts tray, to define movement of parts mover and part to collet 40, to define depth that part 21 is seated in collet 40, to define first position of collet 40 after part installed in collet 40 (for example, collet 40 may be tilted from the position shown in the drawing away from axis Z through an angle H of 20 degrees), to define the first tool that is utilized on part 21, to define the cutting depth of the first tool on part 21, to define the second tool that is utilized on part 21, and to define the cutting depth of the second tool on part 21.

After the VMC is retrofitted in the manner just described, the VMC program and auxiliary programs are run as follows:

Step 1: Insert rectangular tray in tray station and have VMC program 34 (per the directions of VHAP 35) cut openings in the tray for the parts. The VMC program 34 utilizes the parameters programmed in during Step II above.

Step 2: Load parts 16, 21 (see attached drawing) into openings 17 cut in parts tray 15. Each part has an identical shape and dimension.

Step 3: Load parts tray into VMC.

Step 4: VHAP 35 commands loading by tool changer 50 of a spindle probe 11A into spindle 10. Probe 11A is stored in an opening in tray 12, but can be stored on a chain, etc. VHAP directs spindle to move probe to touch two points along a first edge of the tray and a third point along a second edge normal to the first edge to determine the orientation of the parts tray so that the parts mover can be correctly positioned over each opening 17 in the tray to remove and return parts from the opening 17. Since the VHAP knows the X-Y-Z coordinates (i.e., the position of) a selected reference point on spindle 10 at all times, the Step 5: VHAP 35 commands that the probe 11A be removed from spindle 10 and returned to tray 12.

Step 6: VHAP 35 commands that the parts mover 14 be loaded into spindle 10. A vacuum can be formed on parts mover 14 by applying suction on mover 14 through spindle 10, or any other means can be utilized to hold a part in mover 14.

Step 7: VHAP 35 commands spindle 10 to move over an opening 17 in tray 15 and to drop rapidly down a selected distance toward tray 15. Once this selected distance is traversed, the speed of movement of spindle 10 slows to position parts mover 14 adjacent or in contact with the part 21 in tray 15.

Step 8: VHAP 35 commands parts mover 14 to hold part 21 against or in mover 14.

Step 9: VHAP 35 commands spindle 10 to carry mover 14 and part 21 to a position over collet 40.

Step 10: VHAP 35 sends M-code command to PC to open collet 40.

Step 11: PC 30 sends command to collet motor, the motor opens collet 40, and the PC receives confirmation 38 from sensor 25 that collet 40 is opened. The PC 30 transmits an M-fin signal via RS232IO interface and VMC program 34 to VHAP 35.

Step 12: VHAP 35 commands via VMC program 34 that spindle 10 move downwardly in a direction parallel to the Z axis and seat part 21 in collet 40.

Step 13: After part 21 is seated in collet 40, VHAP 35 via VMC program 34 then commands the suction applied via spindle 10 be discontinued. The PC discontinues the suction and sends back an M-fin signal.

Step 14: VHAP 35 commands collet to close via PC 30. PC 30 closes collet 40, receives confirmation 38 from sensor 25 that collet 40 is closed, and transmits an M-fin signal via RS232IO interface and VMC program 34 to VHAP 35.

Step 15: VHAP 35 commands spindle 10 to move upwardly away from collet 40.

Step 16: VHAP 35 loads spindle probe 11A in spindle 10 and utilizes the spindle probe to determine if part 21 is properly seated in collect 40.

Step 17: VHAP 35 commands collet 40 to rotate to a position where the axis or centerline D about which part 21 rotates E1 is a selected angle U from the Y axis.

Step 18: VHAP 35 via VMC program 34 (all VHAP commands are via VMC program) commands spindle 10 to return probe 11A to its tray 12 (or to a chain or other storage device) and load to a tool 11 from tray 22 into spindle 10.

Step 19: After tool 11 is loaded in spindle, VHAP 35 commands spindle 10 to move to a position above sensor surface 48 of table probe 44 and to rapidly drop a selected distance, and then move slowly until the distal tip of tool 11 contacts sensor surface 48. When the tip of tool 11 contacts sensor surface 48, the probe 44 transmits via its control 47 a signal back to VHAP 35 (or PC 30) so that VHAP (or PC 30) can determine whether tool 11 is properly seated in spindle 10 or, possibly, is broken. The signal transmitted back to the VHAP 35 also triggers issuance of a skip input command from VHAP 35 which stops movement of the spindle 10 toward surface 48.

Step 20: If VHAP 35 determines that tool 11 is not properly seated or is broken (because the length of tool 11 is far to short), then VHAP 35 directs that tool 11 be removed from spindle 10, returned to tray 22, and a new tool inserted. If tool 11 is broken, such is recorded in memory 32 of PC 30.

Step 21: If VHAP 35 determines that tool 11 is properly seated in spindle 10, VHAP 35 directs spindle 10 to move to a selected position above part 21, to lower into contact with part 21, and to drill for a selected time and/or to a selected depth in part 21, after which tool 11 is removed from part 21 and returned to tray 22 (or to a storage chain or other storage area). The drill depth is known to VHAP 35 because the VHAP knows the distance tool 11 extends out of spindle 10 and knows the X-Y-Z coordinates of the distal end or tip of spindle 10.

Step 22: VHAP 35 directs probe 11A be loaded into spindle 10. Spindle 10 lowers the probe 11A into the hole just drilled in part 21 to determine if the hole has a proper depth. If the hole has a proper depth, probe 11A is returned to its tray and parts mover 14 is loaded into spindle 10 to return part 21 to opening 17 in tray 22. If the hole in part 21 is not deep enough, VHAP reloads tool 11 in spindle 10 and drills the hole out further, followed by a check with probe 11A. If the hole is too deep, the part is defective and is returned to tray 22 to be discarded. The return of a defective part is recorded in memory 32 of PC 30.

Step 23: After part 21 is returned to tray 15, VHAP directs with an M-code signal via PC 30 that collet 40 be cleaned with hydraulic fluid, compressed air, brushes, etc. Once such cleaning is accomplished, PC 30 sends an M-fin signal back to VHAP, after which a new part is loaded by spindle 10 and parts mover 14 into collet 40, and the foregoing process is repeated.

The VMC program 34 presently controls the motors which move the X-Y table and the spindle 10. The auxiliary program 35 presently controls the motors which move the auxiliary positioning apparatus.

Anything having to do with the specific machining of a work piece mounted in collet 40 can not be a PSI or a PSII.

The retrofitted vertical machining center of the invention is utilized to automatically machine a plurality of like unfixtured parts which are each loosely mounted in a tray and which are each transported from the tray to a collet and are fixed in the collet prior to machining the parts. Unfixtured parts are loosely mounted on a surface or in a tray. In contrast, fixtured parts are bolted or otherwise fastened to a pallet or other support member.

Having described my invention in such terms as to enable those skilled in the art to understand and practice it, and having identified the presently preferred embodiments thereof, I claim:

1. A vertical machining center including
   (a) holding means for holding a workpiece;
   (b) a spindle for holding tools;
   (c) means for
      (i) moving at least one of a pair comprising said spindle and said holding means along at least one vertical axis,
      (ii) moving at least one of the pair comprising said spindle and said holding means in a lateral plane normal to said vertical axis, and
      (iii) rotating said holding means about at least two axes;
   (d) means for loading tools into and unloading tools from said spindle;
   (e) a tray for holding loosely a plurality of workpieces of identical shape and dimension;
   (f) a parts mover adapted to be loaded in said spindle and to pick up a workpiece from said tray and deposit the work piece in said holding means;
   (g) means for loading said parts mover in and unloading said parts mover from said spindle; and
   (h) probe means for determining if a workpiece is properly mounted in said parts mover.

2. A method for retrofitting a conventional vertical machining center to automatically machine small parts, said vertical machining center including
   a spindle,
   holding means for holding a workpiece,
   means for
   moving at least one of said spindle and said holding means along at least one vertical axis, and
   moving at least one of said spindle and said holding means in a lateral plane normal to said vertical axis,
   at least one tool for mounting in said spindle,
   mounting means for mounting said tool in said spindle,
   a computer program for, after said tool is loaded in said spindle, controlling the movement of said spindle to cut material from a workpiece,
   said method including the steps of
      (a) installing on said vertical machining center
         (i) a rotation apparatus for rotating said holding means about at least two axes,
         (ii) a tray for holding loosely a plurality of workpieces of identical shape and dimension,
         (iii) a parts mover adapted to be mounted on said spindle by said mounting means to pick up a workpiece from said tray and deposit the work piece in said holding means and a probe means for determining if a workpiece is properly mounted in said parts mover; and,
      (b) installing an auxiliary computer program to control automatically the operation of said holding means, loading means, and parts mover to move workpieces from said tray to said holding means and remove material from said workpieces in said holding means.

3. A method for utilizing a conventional vertical machining center to automatically machine small parts, said vertical machining center including
   a spindle,
   holding means for holding a workpiece,
   means for
   moving at least one of said spindle and said holding means along at least one vertical axis, and
   moving at least one of said spindle and said holding means in a lateral plane normal to said vertical axis,
   at least one tool for mounting in said spindle,
   mounting means for mounting said tool in said spindle,
   a computer program for, after said tool is loaded in said spindle, controlling the movement of said spindle to cut material from a workpiece,
   said method including the steps of
      (a) installing on said vertical machining center
         (i) a rotation apparatus for rotating said holding means about at least two axes,
         (ii) a tray for holding loosely a plurality of workpieces of identical shape and dimension,
         (iii) a parts mover adapted to be mounted on said spindle by said mounting means to pick up a workpiece from said tray and deposit the workpiece in said holding means;
      (b) installing an auxiliary computer program to control automatically the operation of said holding means, loading means, and parts mover to move workpieces from said tray to said holding means and remove material from said workpieces in said holding means;
      (c) utilizing said parts mover to remove a selected workpiece from a selected location on said tray and to deposit the selected workpiece alone in said holding means;
      (d) removing material from the selected workpiece;
      (e) using said parts mover to remove the selected workpiece from said holding means and return the selected workpiece to said selected location on said tray.

4. A vertical machining center including
   (a) holding means for holding a workpiece;
   (b) a spindle for holding tools;
   (c) means for
      (i) moving at least one of a pair comprising said spindle and said holding means along at least one vertical axis, (ii) moving at least one of the pair comprising said spindle and said holding means in a lateral plane normal to said vertical axis, and (iii) rotating said holding means about at least two axes;

(d) means for loading tools into and unloading tools from said spindle;

(e) a tray for holding loosely a plurality of workpieces of identical shape and dimension;

(f) a parts mover adapted to be loaded in said spindle and to pick up a workpiece from said tray and deposit the workpiece in said holding means;

(g) means for loading said parts mover in and unloading said parts mover from said spindle; and, (h) probe means for determining if a workpiece is properly mounted in said holding means.

5. The method of claim 2 wherein said auxiliary computer program identifies defective parts.

6. The method of claim 2 wherein (a) first and second probes are installed; and, (b) said auxiliary computer program controls said second probe to determine when a tool is mounted in said parts mover.

* * * * *